Aug. 7, 1934.   C. R. BUSCH   1,968,871
SAFETY SUPPORTING MEANS FOR BRAKE BEAMS
Filed March 2, 1932
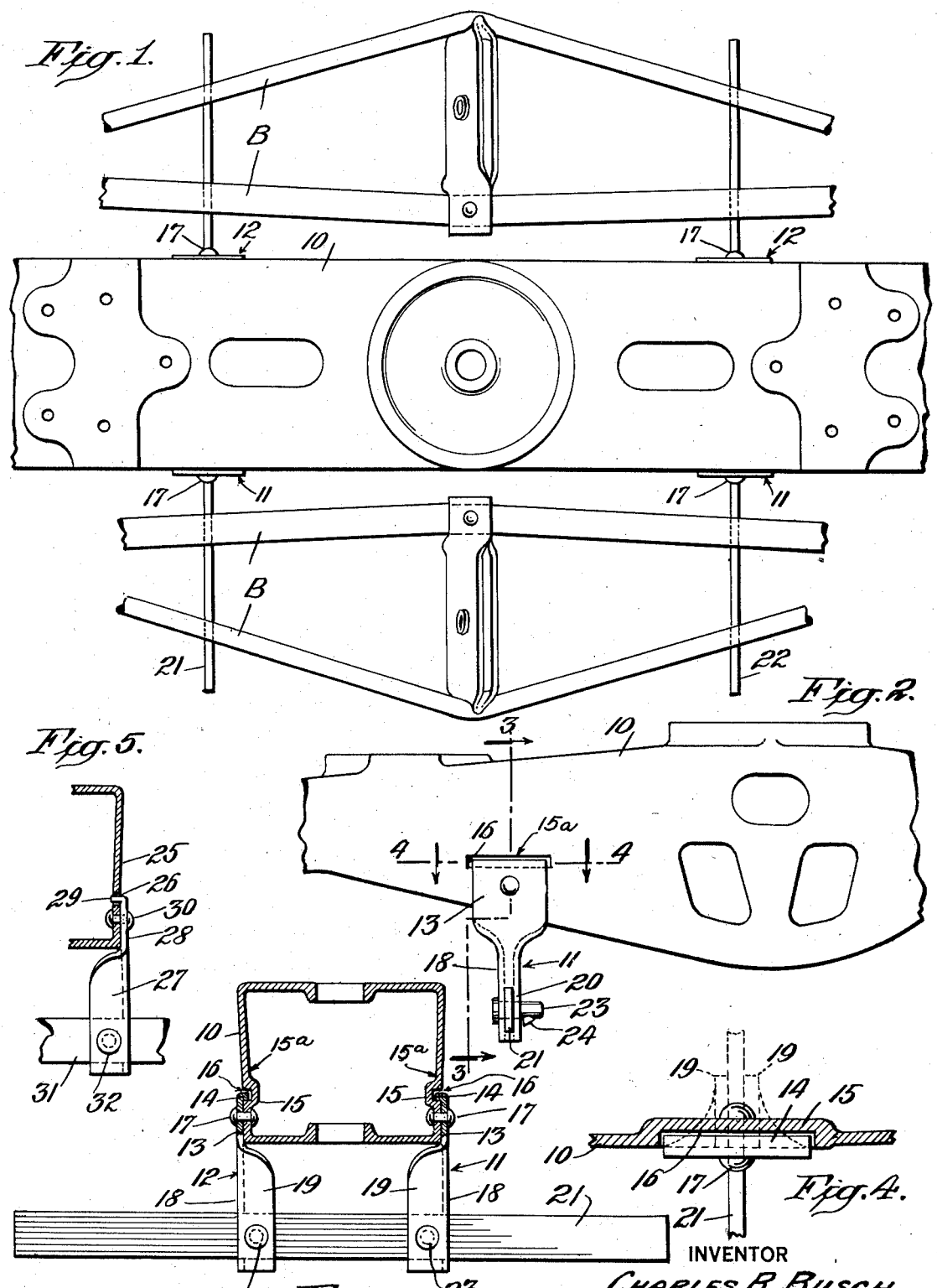
INVENTOR
CHARLES R. BUSCH
BY
Geo. T. Wheelock
ATTORNEY Patented Aug. 7, 1934

1,968,871

UNITED STATES PATENT OFFICE 1,968,871

SAFETY SUPPORTING MEANS FOR BRAKE BEAMS

Charles R. Busch, Orange, N. J., assignor to Buffalo Brake Beam Company, New York, N. Y., a corporation of New York Application March 2, 1932, Serial No. 596,182

4 Claims. (Cl. 188—210)

The present invention relates to safety supporting means or auxiliary supports for brake beams wherein the supporting hangers may be mounted upon the bolster of a car truck or from the spring plank, the specific invention being more particularly adapted for mounting the brackets rigidly upon the bolster.

An object of the invention is to enable the number of rivets which secure the brackets to the truck member to be reduced to one for each bracket, whereby to cheapen the cost in this respect, and, where a single rivet is employed, means are desirably provided to supplement the holding effect of the rivet, by specially constructing the truck member and each bracket, and to obtain such stability for each bracket as to prevent movement thereof with respect to the rivet, although the invention is not necessarily restricted to the use of a single rivet.

A more specific object of the present invention is to provide brackets which are peculiarly adapted for mounting upon a truck bolster and to specially construct the bolster so as to receive and hold the brackets in their rigidly mounted position.

Another object of the invention is to so modify the brackets disclosed by U. S. Letters Patent 1,708,117, dated April 9, 1929, as to adapt them more specifically for use upon a truck bolster, and thereby to support safety bars in proper position below the bolster.

These being among the objects of the present invention, the same consists of certain features of construction and combinations of parts to be hereinafter described and then claimed with reference to the accompanying drawing illustrating preferred embodiments of the invention and wherein Fig. 1 is a plan of fragmentary portions of a truck bolster and brake beams, together with safety bars upon which the beams are supported, in accordance with the present invention;

Fig. 2 is a side elevation of a portion of a truck bolster upon which hanger brackets are supported in accordance with the preferred form of the present invention;

Fig. 3 is a section on the line 3—3, Fig. 2, showing a pair of brackets and a safety bar carried thereby;

Fig. 4 is a section on the line 4—4, Fig. 2, disclosing a detail of the preferred construction, and Fig. 5 is a transverse section of a portion of a truck bolster illustrating a bracket and a safety bar, the same including a modification of the invention.

Referring to Fig. 1, the truck member here illustrated consists in a bolster 10, hanger brackets 11 and 12, respectively located at opposite sides of the bolster, there being two pairs of the brackets. The brake beams B, B are shown above the safety bars 21, 22 which are carried by the brackets.

Now referring to Figs. 2, 3 and 4, the preferred construction in these connections will be described. Each bracket 11, 12 has its upper portion 13 resting flat against the adjacent side wall of the bolster 10. Each bracket is provided at its upper end with a transverse terminal lip 14 formed integrally therewith so as to project inwardly towards the bolster. Portions 15 of the side walls of the bolster are depressed and are formed with longitudinal recesses 16 so as to enable the lip 14 of each bracket to engage therein. In such case an integral portion 15a of the side wall directly overhangs the lip 14.

It is preferred to use a single rivet 17 to pass through each bracket and the adjacent wall of the bolster so as to secure the bracket thereto. When the lip 14 is at the upper terminal of the bracket, the rivet 17 passes through the adjacent wall of the bolster at a point between the bottom of the bolster and the recess 16 which receives the lip. By means of the mutually engaging lip 14 and the depressed portion 15 of the bolster, the stability of each hanger bracket is assured, inasmuch as the bracket is prevented from turning around the rivet 17, thus supplementing the rivet in rigidly mounting the bracket upon the bolster. By the employment of such mounting means the recesses 16 may be located in the lower portion of the bolster and those portions of the brackets which are held against the bolster are relatively short in height as compared with the vertical dimensions of the bolster.

Each bracket is preferably formed more or less along the lines of the construction, described and claimed in U. S. Letters Patent 1,708,117 before mentioned. This means that each bracket is preferably formed of stamped and pressed sheet metal and each will include a web member 18 disposed in substantially the same plane as the attaching portion 13, while there will also be provided a pair of laterally extending members 19 which are spaced apart for the proper distance. These inwardly bent lateral members 19 extend substantially up to the bottom of the bolster, to thereby secure desirable rigidity in the bracket. Each bracket is provided with a hole 20 having a width substantially that of the distance between the lateral portions 19 of each bracket and a height corresponding to the vertical dimensions of the safety bars 21, 22.

Each safety bar 21, 22 is passed longitudinally through opposite openings of a pair of the hanger brackets and extends beyond opposite sides of the bolster as shown in Fig. 1 so that they are in position for supporting the brake beams B, B in the event that either of them should require support in the case of emergency. Locking pins 23 are then passed through openings in the bracket portions 19 and the safety bars, and preferably these pins are provided with movable keepers 24 to enable each safety bar to be removed, if desired.

In the form of the invention illustrated in Figs. 2, 3 and 4 the recesses 16 are closed or blind ones, but in the modified construction shown in Fig. 5 there is a slight difference in this respect. In Fig. 5 the bolster 25 is provided with an open slot 26 in its vertical wall and the bracket 27 is of a length to extend a suitable distance below the bolster, it having an upper portion 28 adapted to rest flat against the adjacent wall of the bolster. The upper end of the bracket is terminated by a transverse lip 29 which is adapted to pass through and engage in the slot 26. In other respects the modified construction is the same as the preferred construction and it is also preferred to secure the bracket in position by means of a single rivet 30. When the modified construction is used it is not necessary to depress portions of the side walls of the bolster, but merely to slot them. The lip 29 is shown as slightly longer than the lip 14 of the preferred construction, so that the lip 29 can pass entirely through the adjacent side wall of the bolster. The safety bar 31 may be held to the bracket as by a pin 32.

It will be obvious to those skilled in the art that the invention is susceptible to other constructions and still be within the scope of the appended claims.

What I claim as new is,—

1. In safety supporting means for brakebeams, the combination with a transverse truck member, of a supporting bracket for a safety bar, means for affixing the bracket in depending position upon a lateral outward wall of the truck member, and means supplemental to the affixing means and including mutually engaging integral portions between the bracket and such wall, one such portion providing a surrounded recess in such wall and the other portion an inward projection on the bracket and entering the recess.

2. In safety supporting means for brakebeams, the combination with a transverse truck member, of a supporting bracket for a safety bar, a rivet for affixing the bracket in depending position upon a lateral outward wall of the truck member, and means supplemental to the rivet and including mutually engaging integral portions between the bracket and such wall, one such portion providing a surrounded recess in such wall and the other portion an inward projection on the bracket and entering the recess, the rivet being located between the recess and the bottom of the truck member.

3. In safety supporting means for brakebeams, the combination with a truck bolster, of paired hanger brackets rigidly mounted on opposite sides of the bolster, the mounting means for each bracket including a rivet through the bracket and the adjacent wall of the bolster and mutually engaged integral portions of the bracket and such wall, one such portion providing a surrounded recess in the wall and the other portion an inward projection on the bracket, safety bars extending beyond each side of the bolster, and means for securing the bars to the lower ends of the brackets.

4. In safety supporting means for brakebeams, the combination with a truck bolster, of paired hanger brackets rigidly mounted on opposite sides of the bolster, the mounting means for each bracket including a rivet through the bracket and the adjacent wall of the bolster, the bolster having inwardly closed longitudinal recesses and the brackets provided with transverse lips engaged in the recesses, safety bars extending beyond each side of the bolster, and means for securing the bars to the lower ends of the brackets.

CHARLES R. BUSCH.